United States Patent
Imai

[11] 4,232,944
[45] Nov. 11, 1980

[54] STANDARD PHOTOGRAPHIC LENS

[75] Inventor: Toshihiro Imai, Hachiouji, Japan

[73] Assignee: Olympus Optical Co., Ltd., Tokyo, Japan

[21] Appl. No.: 940,853

[22] Filed: Sep. 8, 1978

[30] Foreign Application Priority Data

Sep. 13, 1977 [JP] Japan .................. 52-110241

[51] Int. Cl.³ ............................................. G02B 9/36
[52] U.S. Cl. .............................................. 350/222
[58] Field of Search ...................................... 350/222

[56] References Cited

U.S. PATENT DOCUMENTS

| | | | |
|---|---|---|---|
| 3,459,468 | 8/1969 | Manx et al. ................... | 350/176 |
| 3,495,895 | 2/1970 | Schlegel ....................... | 350/220 |
| 3,652,151 | 3/1972 | Kawabe et al. ................ | 350/222 |

FOREIGN PATENT DOCUMENTS

| | | | |
|---|---|---|---|
| 1128677 | 4/1962 | Fed. Rep. of Germany ............ | 350/222 |
| 38-12978 | 7/1963 | Japan ..................................... | 350/222 |
| 47-50730 | 12/1972 | Japan ..................................... | 350/222 |
| 47-50731 | 12/1972 | Japan ..................................... | 350/222 |
| 49-23770 | 6/1974 | Japan ..................................... | 350/222 |
| 746201 | 3/1956 | United Kingdom .................... | 350/222 |

*Primary Examiner*—Paul A. Sacher
*Attorney, Agent, or Firm*—Cushman, Darby & Cushman

[57] ABSTRACT

A standard photographic lens system comprising a first positive meniscus lens component, a second meniscus cemented doublet lens component, a third meniscus cemented doublet lens component and a fourth positive lens component. In said lens system, large radii of curvature are selected on the cemented surfaces of the second and third lens component respectively for facilitating to manufacture the respective elements of these two lens components, glass materials having low refractive indices are used for the respective lens elements for making it possible to manufacture said lens system at low cost, and various aberrations are favorably corrected.

4 Claims, 4 Drawing Figures

STANDARD PHOTOGRAPHIC LENS

BACKGROUND OF THE INVENTION

1. Field of the Invention

The present invention relates to a standard photographic lens system for single-lens reflex photographic cameras.

2. Description of the Prior Art

In Gauss type standard lens systems having aperture ratios on the order of F1.8 to F2.0, radii of curvature are generally small on the surfaces of a cemented lens component arranged on the front side of a stop or lens elements of said component arranged with an airspace therebetween and a cemented lens component arranged on the rear side of the stop. Therefore, it is possible to arrange a large number of lenses on the polishing dish in machining the above-mentioned lens elements of said type lens systems, thereby unavoidably requiring many manufacturing processes. Further, these lens elements have thin edges and can not be manufactured with high yield. Though it can be considered to select larger radii of curvature on the lens surfaces for facilitating to manufacture lens elements, large radii of curvature will aggravate asymmetry of coma. Furthermore, centering will be difficult in case where the surfaces on both sides of a lens element are to be nearly concentric. In addition, Petzval's sum will be disadvantageous when inexpensive glass materials (most of these materials have refractive indices relatively not so high) are used for manufacturing lens systems at low cost.

SUMMARY OF THE INVENTION

A general object of the present invention is to provide a compact standard photographic lens system in which various aberrations are favorably corrected, large radii of curvature are selected on the surfaces of respective lens elements of the seocnd and third lens components, and inexpensive glass materials having low refractive indices are used for lens elements composing said lens system.

The lens system according to the present invention has such a composition as shown in FIG. 1. Speaking more concretely, said lens system comprises a first positive meniscus lens component, a second cemented doublet component consisting of a positive meniscus lens element and a negative meniscus lens element, a third cemented doublet component consisting of a negative lens element and a positive lens element and a fourth positive lens component, and said lens system is so designed as to satisfy the following conditions:

$$0.38f < r_3 < 0.46f \quad (1)$$

$$0.5f < r_r < 2f \quad (2)$$

$$0.25f < r_5 < 0.29f \quad (3)$$

$$0.25f < -r_6 < 0.29f \quad (4)$$

$$f < -r_7 \quad (5)$$

$$0.33f < -r_8 < 0.4f \quad (6)$$

$$0.22f < d_5 < 0.28f \quad (7)$$

$$1.6 < n_1, n_2, n_5, n_6 < 1.8 \quad (8)$$

$$15 < \nu_2 - \nu_3 \quad (9)$$

$$13 < \nu_5 - \nu_4 \quad (10)$$

wherein the reference symbols represent as defined below:

$r_3, r_4, r_5, r_6, r_7, r_8$: radii of curvature on the surfaces of the respective lens elements of the second and third lens components $d_5$: airspace between the second and third lens components $n_1, n_2, n_5, n_6$: refractive indices of the first lens component, the object side element of the second lens component, the image side element of the third lens component and the fourth lens component respectively $\nu_2, \nu_3, \nu_4, \nu_5$: Abbe's numbers of the respective elements of the second and third lens components $f$: focal length of the entire lens system as a whole Now, significance of the above-mentioned conditions will be described consecutively.

The conditions (1) through (6) define radii of curvature on the surfaces of the respective elements of the second and third lens components. On each of these surfaces, radius of curvature is selected larger than the lower limit of each of the conditions in order to facilitate to manufacture each of the elements of both the lens components. Further, radius of curvature on each of said lens surfaces is defined smaller than the upper limit of each of the conditions for favorably correcting various aberrations in the lens system. If radius of curvature on each surface is smaller than the lower limit, coma will be undercorrected. Though it is rather advantageous to select a smaller radius of curvature on each of the lens surfaces for favorably correcting coma, the present invention defines the lower limits of radii of curvature on the respective lens surfaces as specified by the conditions (1) through (6) for facilitating to manufacture the respective lens elements as already described above. Therefore, radii of curvature smaller than the lower limits are undesirable from the viewpoint of manufacturing the lens elements. The problem of undercorrection of coma unavoidably deriving from definition of these lower limits is solved by adopting the conditions (7) and (8). Of the conditions (1) through (6), the conditions (1) and (6) define upper limits for maintaining symmetry of offaxial lateral aberration. If these upper limmits are exceeded, asymmetry of comma will be remarkably aggravated. The upper limits of the condition (3) and (4) are required for obtaining a back focal length $f_B$ larger than 0.68f which is essential for a lens system for single-lens reflex photographic cameras. If the upper limits of the conditions (3) and (4) are exceeded, it will be impossible to obtain a back focal length longer than the value mentioned above. The upper limits of the conditions (2) and (5) are necessary for adequately balancing paraxial chromatic aberration with offaxial chromatic aberration, and therefore effective to favorably correct chromatic aberration in conjunction with the conditions (9) and (10). If the upper limits of the conditions (2) and (5) are exceeded, it will be impossible to adequately balance paraxial chromatic aberration with offaxial chromatic aberration.

The conditions (7) and (8) are defined for correcting coma as already described above. If $d_5$ is smaller than the lower limit of the condition (7), it will be impossible to minimize coma and curvature of field. If $d_5$ is larger than the upper limit of the condition (7), in contrast, the entire lens system will unavoidably have a long total length and, in addition, a large diameter to assure sufficient intensity for marginal rays, therby making it impossible to design a compact lens system.

The condition (8) is adopted for minimizing Petzval's sum while using inexpensive materials having refractive indices as low as possible for the respective lens elements and maintaining symmetrical coma. Two low refractive indices will be undesirable for Petzval's sum but rather preferable for correcting coma. The lower limit of the condition (8) is defined for considering the conflicting effects of refractive indices. The upper limit of this condition is necessary for making it possible to use inexpensive materials for the respective lens elements of the lens system. If the refractive indices are smaller than the lower limit of the condition (8), Petzval's sum will be increased. If the upper limit of the condition (8) is exceeded, refractive indices will be high enough to oblige to use expensive materials for the respective lens elements.

The conditions (9) and (10) are necessary for favorably correcting chromatic aberration as already described above. Abbe's numbers deviating from the ranges defined by these conditions will unavoidably aggravate chromatic aberration.

In addition to the conditions described above, it will be more preferable to design the lens system so as to satisfy the conditions mentioned below:

$$0.14f < d_3 + d_4 < 0.19f \quad (11)$$

$$0.10f < d_6 + d_7 < 0.14f \quad (12)$$

wherein the reference symbols represent as defined below:

$d_3, d_4, d_6, d_7$: thicknesses of the respective elements of the second and third lens components If the upper limit of the condition (11) or (12) is exceeded, it will be impossible to design a compact lens system and intensity of marginal rays will unavoidably be lowered. If $d_3 + d_4$ or $d_6 + d_7$ is smaller than the lower limit of the condition (11) or (12), in contrast, curvature of field will undesirably be aggravated. Further, it will be preferable from the viewpoint to reduce manufacturing cost to select a large thickness for the lens element having the lower refractive index in each of the second and third lens components. Therefore, it is effective to design the lens elements having the lower refractive indices so as to have relatively large thicknesses within the ranges defined by the conditions and within such ranges that the other lens elements are not too thin, for example in their edges, for convenient manufacturing.

DETAILED DESCRIPTION OF THE PREFERRED EMBODIMENTS

Figure 1:
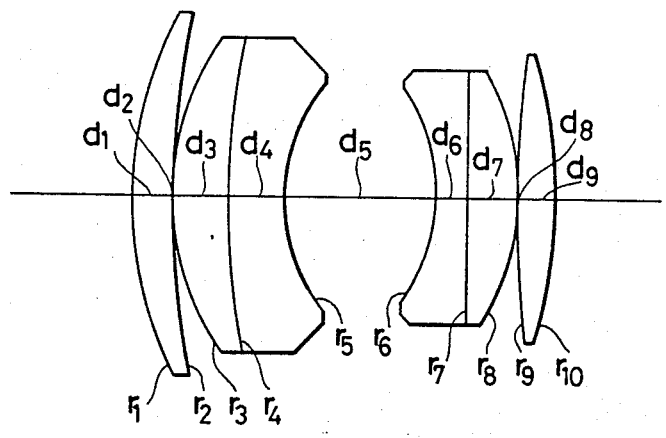
FIG. 1 shows a sectional view illustrating the composition of the photographic lens system according to the present invention.
Figure 2:
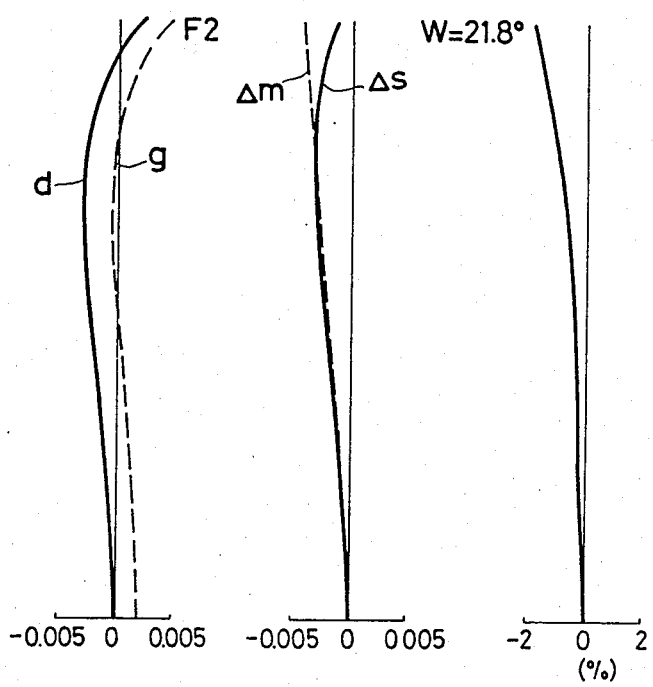
FIG. 2 shows curves illustrating the aberration characteristics of the Embodiment 1.
Figure 3:
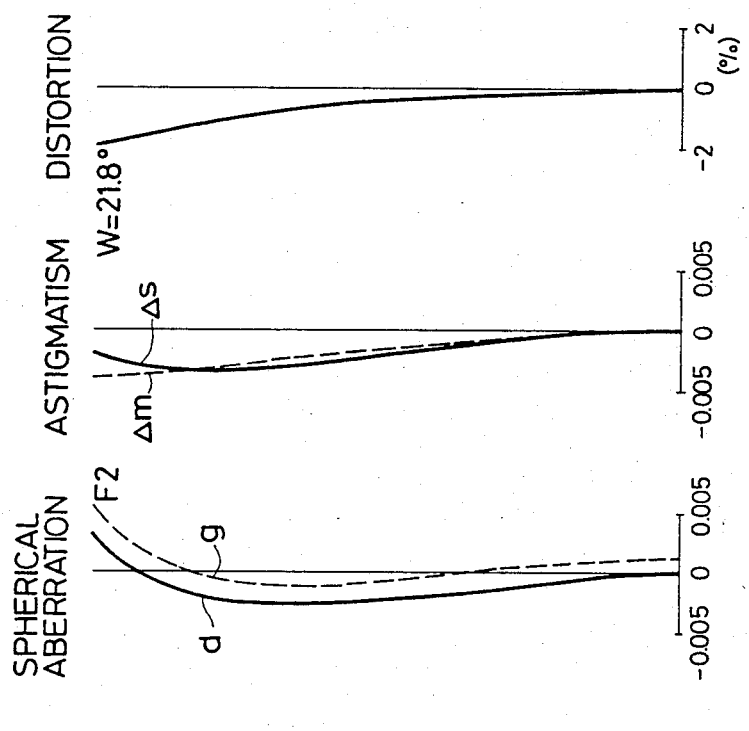
FIG. 3 shows curves illustrating the aberration characteristics of the Embodiment 2.
Figure 4:
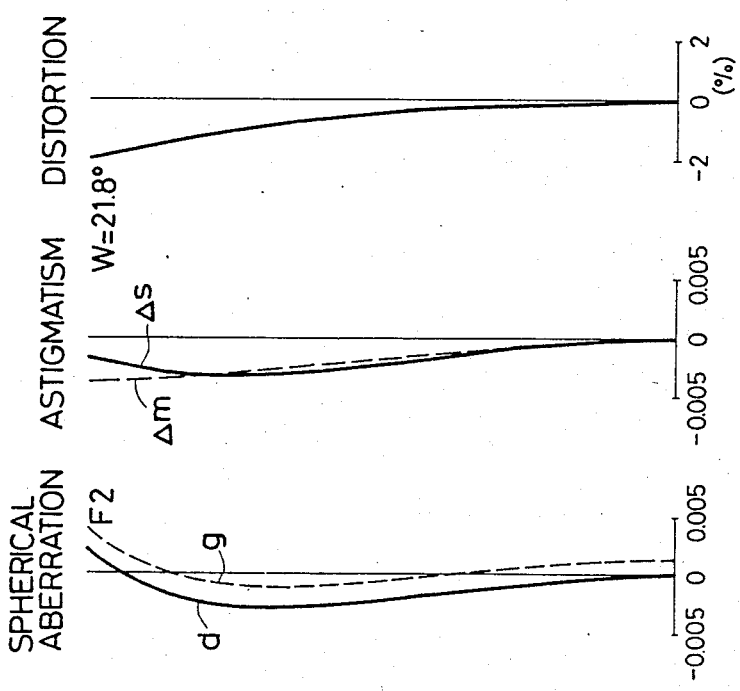
FIG. 4 illustrates graphs visualizing the aberration characteristics of the Embodiment 3.

Now, some preferred embodiments of the photographic lens system according to the present invention will be described detailedly with reference to the accompanying drawings.

Embodiment 1

| | | | |
|---|---|---|---|
| $r_1 = 0.6$ | | | |
| $r_2 = 1.4634$ | $d_1 = 0.0654$ | $n_1 = 1.72$ | $\nu_1 = 50.25$ |
| | $d_2 = 0.0018$ | | |
| $r_3 = 0.4367$ | | | |
| $r_4 = 1.0010$ | $d_3 = 0.0910$ | $n_2 = 1.72$ | $\nu_2 = 46.03$ |
| | $d_4 = 0.0836$ | $n_3 = 1.72022$ | $\nu_3 = 29.31$ |
| $r_5 = 0.2676$ | | | |
| | $d_5 = 0.2299$ | | |
| $r_6 = -0.2723$ | | | |
| $r_7 = -1.0764$ | $d_6 = 0.0432$ | $n_4 = 1.69895$ | $\nu_4 = 30.12$ |
| | $d_7 = 0.0764$ | $n_5 = 1.72$ | $\nu_5 = 50.25$ |
| $r_8 = -0.3812$ | | | |
| | $d_8 = 0.0018$ | | |
| $r_9 = 3.7632$ | | | |
| $r_{10} = -0.6704$ | $d_9 = 0.0545$ | $n_6 = 1.69350$ | $\nu_6 = 53.23$ |
| $\Sigma d = 0.648$ | | | |
| $f = 1$ | $f_B = 0.691$ | | |

Embodiment 2

| | | | |
|---|---|---|---|
| $r_1 = 0.579$ | | | |
| $r_2 = 1.399$ | $d_1 = 0.0654$ | $n_1 = 1.72$ | $\nu_1 = 46.03$ |
| | $d_2 = 0.0018$ | | |
| $r_3 = 0.438$ | | | |
| $r_4 = 1.182$ | $d_3 = 0.0827$ | $n_2 = 1.72$ | $\nu_2 = 46.03$ |
| | $d_4 = 0.0845$ | $n_3 = 1.72022$ | $\nu_3 = 29.31$ |
| $r_5 = 0.278$ | | | |
| | $d_5 = 0.2352$ | | |
| $r_6 = -0.274$ | | | |
| $r_7 = \infty$ | $d_6 = 0.0494$ | $n_4 = 1.68893$ | $\nu_4 = 31.08$ |
| | $d_7 = 0.0756$ | $n_5 = 1.72$ | $\nu_5 = 46.03$ |
| $r_8 = -0.381$ | | | |
| | $d_8 = 0.0018$ | | |
| $r_9 = 3.499$ | | | |
| $r_{10} = -0.740$ | $d_9 = 0.0545$ | $n_6 = 1.69700$ | $\nu_6 = 48.51$ |
| $\Sigma d = 0.651$ | | | |
| $f = 1$ | $f_B = 0.694$ | | |

Embodiment 3

| | | | |
|---|---|---|---|
| $r_1 = 0.5678$ | | | |
| $r_2 = 1.3429$ | $d_1 = 0.0665$ | $n_1 = 1.713$ | $\nu_1 = 53.89$ |
| | $d_2 = 0.0018$ | | |
| $r_3 = 0.4126$ | | | |
| $r_4 = 0.5590$ | $d_3 = 0.0902$ | $n_2 = 1.713$ | $\nu_2 = 53.89$ |
| | $d_4 = 0.0660$ | $n_3 = 1.72022$ | $\nu_3 = 29.31$ |
| $r_5 = 0.2675$ | | | |
| | $d_5 = 0.2689$ | | |
| $r_6 = -0.2594$ | | | |
| $r_7 = -1.2039$ | $d_6 = 0.0354$ | $n_4 = 1.72022$ | $\nu_4 = 29.31$ |
| | $d_7 = 0.0821$ | $n_5 = 1.74320$ | $\nu_5 = 49.41$ |
| $r_8 = -0.3461$ | | | |
| | $d_8 = 0.0018$ | | |
| $r_9 = 3.2939$ | | | |
| $r_{10} = -0.7262$ | $d_9 = 0.0509$ | $n_6 = 1.67003$ | $\nu_6 = 47.25$ |
| $\Sigma d = 0.664$ | | | |
| $f = 1$ | $f_B = 0.691$ | | | wherein the reference symbols $r_1$ through $r_{10}$ represent radii of curvature on the surfaces of the respective lens elements, the reference symbols $d_1$ through $d_9$ designate thicknesses of the respective lens elements and airspaces therebetween, the reference symbols $n_1$ through $n_6$ denote refractive indices of the respective lens elements and the reference symbols $\nu_1$ through $\nu_6$ represent Abbe's numbers of the respective lens elements.

I claim:

1. A standard photographic lens system comprising a first positive meniscus lens component, a second cemented doublet component consisting of a positive meniscus lens element and a negative meniscus lens element, a third cemented doublet component consisting of a negative lens element and a positive lens element and a forth positive lens component, and said lens system satisfying the conditions enumerated below:

$$0.41f < r_3 < 0.44f \quad (1)$$

$$0.5f < r_4 < 1.2 \quad (2)$$

$$0.25f < r_5 < 0.29f \quad (3)$$

$$0.25f < -r_6 < 0.28f \quad (4)$$

$$f < -r_7 < \infty \quad (5)$$

$$0.33f < -r_8 < 0.4f \quad (6)$$

$$0.22f < d_5 < 0.28f \quad (7)$$

$$\begin{aligned} 1.71 < n_1 < 1.73 \\ 1.71 < n_2 < 1.73 \\ 1.71 < n_5 < 1.75 \\ 1.67 < n_6 < 1.70 \end{aligned} \quad (8)$$

$$16 < \nu_2 - \nu_3 < 25 \quad (9)$$

$$14 < \nu_5 - \nu_4 < 21 \quad (10)$$

$$0.14f < d_3 + d_4 < 0.19f \quad (11)$$

$$0.10f < d_6 + d_7 < 0.14f \quad (12)$$

wherein the reference symbols $r_3$, $r_4$ and $r_5$ represent radii of curvature on the surfaces of the respective elements of the second lens component, the reference symbols $r_6$, $r_7$ and $r_8$ designate radii of curvature on the surfaces of the respective elements of the third lens component, the reference symbol $d_5$ denotes the airspace between the second and third lens components, the reference symbol $n_1$ represents refractive index of the first lens component, the reference symbol $n_2$ designates refractive index of the object side element of the second lens component, the reference symbol $n_5$ denotes refractive index of the image side element of the third lens component, the reference symbol $n_6$ represents refractive index of the fourth lens component, the reference symbols $\nu_2$ and $\nu_3$ designate Abbe's numbers of both the elements of the second lens component, the reference symbols $\nu_4$ and $\nu_5$ represent Abbe's numbers of both the elements of the third lens component, the reference symbols $d_3$ and $d_4$ represent thicknesses of both the elements of the second lens component, the reference symbols $d_6$ and $d_7$ designate thicknesses of both the elements of the third lens component and the reference symbol f designates focal length of the entire lens system as a whole.

2. A standard photographic lens system according to claim 1 having the following numerical data:

| | | | |
|---|---|---|---|
| $r_1 = 0.6$ | | | |
| | $d_1 = 0.0654$ | $n_1 = 1.72$ | $\nu_1 = 50.25$ |
| $r_2 = 1.4634$ | | | |
| | $d_2 = 0.0018$ | | |
| $r_3 = 0.4367$ | | | |
| | $d_3 = 0.0910$ | $n_2 = 1.72$ | $\nu_2 = 46.03$ |
| $r_4 = 1.0010$ | | | |
| | $d_4 = 0.0836$ | $n_3 = 1.72022$ | $\nu_3 = 29.31$ |
| $r_5 = 0.2676$ | | | |
| | $d_5 = 0.2299$ | | |
| $r_6 = -0.2723$ | | | |
| | $d_6 = 0.0432$ | $n_4 = 1.69895$ | $\nu_4 = 30.12$ |
| $r_7 = -1.0764$ | | | |
| | $d_7 = 0.0764$ | $n_5 = 1.72$ | $\nu_5 = 50.25$ |
| $r_8 = -0.3812$ | | | |
| | $d_8 = 0.0018$ | | |
| $r_9 = 3.7632$ | | | |
| | $d_9 = 0.0545$ | $n_6 = 1.69350$ | $\nu_6 = 53.23$ |
| $r_{10} = -0.6704$ | | | |
| | $\Sigma d = 0.648$ | | |
| $f = 1$ | | $f_B = 0.691$ | | wherein the reference symbols $r_1$ through $r_{10}$ represent radii of curvature on the surfaces of the respective lens elements, the reference symbols $d_1$ through $d_9$ designate thickness of the respective lens elements and airspaces therebetween, the reference symbols $n_1$ through $n_6$ denote refractive indices of the respective lens elements, the reference symbols $\nu_1$ through $\nu_6$ represent Abbe's numbers of the respective lens elements, the reference symbol f designates focal length of the entire lens system as a whole and the reference symbol $f_B$ denotes back focal length.

3. A standard photographic lens system according to claim 1 having the following numerical data:

| | | | |
|---|---|---|---|
| $r_1 = 0.579$ | | | |
| | $d_1 = 0.0654$ | $n_1 = 1.72$ | $\nu_1 = 46.03$ |
| $r_2 = 1.399$ | | | |
| | $d_2 = 0.0018$ | | |
| $r_3 = 0.438$ | | | |
| | $d_3 = 0.0827$ | $n_2 = 1.72$ | $\nu_2 = 46.03$ |
| $r_4 = 1.182$ | | | |
| | $d_4 = 0.0845$ | $n_3 = 1.72022$ | $\nu_3 = 29.31$ |
| $r_5 = 0.278$ | | | |
| | $d_5 = 0.2352$ | | |
| $r_6 = -0.274$ | | | |
| | $d_6 = 0.0494$ | $n_4 = 1.68893$ | $\nu_4 = 31.08$ |
| $r_7 = \infty$ | | | |
| | $d_7 = 0.0756$ | $n_5 = 1.72$ | $\nu_5 = 46.03$ |
| $r_8 = -0.381$ | | | |
| | $d_8 = 0.0018$ | | |
| $r_9 = 3.499$ | | | |
| | $d_9 = 0.0545$ | $n_6 = 1.69700$ | $\nu_6 = 48.51$ |
| $r_{10} = -0.740$ | | | |
| | $\Sigma d = 0.651$ | | |
| $f = 1$ | | $f_B = 0.694$ | | wherein the reference symbols $r_1$ through $r_{10}$ represent radii of curvature on the surfaces of the respective lens elements, the reference symbols $d_1$ through $d_9$ designate thickness of the respective lens elements and airspaces therebetween, the reference symbols $n_1$ through $n_6$ denote refractive indices of the respective lens elements, the reference symbols $\nu_1$ through $\nu_6$ represent Abbe's numbers of the respective lens elements, the reference symbol f designates focal length of the entire lens system as a whole and the reference symbol $f_B$ denotes back focal length.

4. A standard photographic lens system according to claim 1 having the following numerical data:

| | | | |
|---|---|---|---|
| $r_1 = 0.5678$ | | | |
| | $d_1 = 0.0665$ | $n_1 = 1.713$ | $\nu_1 = 53.89$ |
| $r_2 = 1.3429$ | | | |
| | $d_2 = 0.0018$ | | |
| $r_3 = 0.4126$ | | | |
| | $d_3 = 0.0902$ | $n_2 = 1.713$ | $\nu_2 = 53.89$ |
| $r_4 = 0.5590$ | | | |
| | $d_4 = 0.0660$ | $n_3 = 1.72022$ | $\nu_3 = 29.31$ |

-continued

| | | | |
|---|---|---|---|
| $r_5 = 0.2675$ | | | |
| | $d_5 = 0.2689$ | | |
| $r_6 = -0.2594$ | | | |
| | $d_6 = 0.0354$ | $n_4 = 1.72022$ | $\nu_4 = 29.31$ |
| $r_7 = -1.2039$ | | | |
| | $d_7 = 0.0821$ | $n_5 = 1.74320$ | $\nu_5 = 49.41$ |
| $r_8 = -0.3461$ | | | |
| | $d_8 = 0.0018$ | | |
| $r_9 = 3.2939$ | | | |
| | $d_9 = 0.0509$ | $n_6 = 1.67003$ | $\nu_6 = 47.25$ |
| $r_{10} = -0.7262$ | | | |
| $\Sigma d = 0.664$ | | | |

-continued

| | |
|---|---|
| $f = 1$ | $f_B = 0.691$ | wherein the reference symbols $r_1$ through $r_{10}$ represent radii of curvature on the surfaces of the respective lens elements, the reference symbols $d_1$ through $d_9$ designate thickness of the respective lens elements and airspaces therebetween, the reference symbols $n_1$ through $n_6$ denote refractive indices of the respective lens elements, the reference symbols $\nu_1$ through $\nu_6$ represent Abbe's numbers of the respective lens elements, the reference symbol f designates focal length of the entire lens system as a whole and the reference symbol $f_B$ denotes back focal length.

* * * * *